US012015207B2

(12) United States Patent
Jervis

(10) Patent No.: US 12,015,207 B2
(45) Date of Patent: Jun. 18, 2024

(54) WIDEBAND ANTENNAS AND ACCESS POINTS INCLUDING SUCH ANTENNAS

(71) Applicant: ARRIS Enterprises LLC, Suwanee, GA (US)

(72) Inventor: James W. Jervis, Santa Clara, CA (US)

(73) Assignee: Ruckus IP Holdings LLC, Claremont, NC (US)

(*) Notice: Subject to any disclaimer, the term of this patent is extended or adjusted under 35 U.S.C. 154(b) by 176 days.

(21) Appl. No.: 17/835,998

(22) Filed: Jun. 9, 2022

(65) Prior Publication Data

US 2023/0024815 A1 Jan. 26, 2023

Related U.S. Application Data

(60) Provisional application No. 63/223,723, filed on Jul. 20, 2021.

(51) Int. Cl.

| | |
|---|---|
| ***H01Q 1/22*** | (2006.01) |
| ***H01Q 1/38*** | (2006.01) |
| ***H01Q 19/24*** | (2006.01) |
| ***H01Q 21/06*** | (2006.01) |
| ***H01Q 21/30*** | (2006.01) |

(52) U.S. Cl.

CPC ........... *H01Q 21/30* (2013.01); *H01Q 1/2291* (2013.01); *H01Q 1/38* (2013.01); *H01Q 19/24* (2013.01); *H01Q 21/062* (2013.01)

(58) Field of Classification Search

CPC ........ H01Q 21/30; H01Q 1/2291; H01Q 1/38; H01Q 19/24; H01Q 21/062; H01Q 3/44; H01Q 11/105; H01Q 21/205

See application file for complete search history.

(56) References Cited

U.S. PATENT DOCUMENTS 10,454,185 B1 * 10/2019 Moran ................. H01Q 11/105

FOREIGN PATENT DOCUMENTS

WO 2015170276 A1 11/2015

OTHER PUBLICATIONS

"Kumar Hemant et al., "Compact Planar Log-Periodic Dipole Array Based Yagi-uda Antenna," 2017 IEEE International Symposium on Antennas and Propagation, IEEE, Jul. 9, 2017, pp. 2157-2158".

"PCT Search Report and Written Opinion in corresponding patent application No. PCTUS22030799 mailed Sep. 15, 2022, 16 pages".

"Zhai Guohua et al., "Gain Enhancement of Printed Log-Periodic Diple Array Antenna Using Director Cell," IEEE Transactions on Antennas and Propogation, IEEE, vol. 62, No. 11, Nov. 1, 2014, pp. 5915-5919".

* cited by examiner

*Primary Examiner* — David E Lotter

(74) *Attorney, Agent, or Firm* — Myers Bigel, P.A.

(57) ABSTRACT

An antenna comprises a printed circuit board that includes a central feed point and a plurality of antenna elements formed therein, where the antenna elements extending radially from the central feed point. Each antenna element comprises a feed line that is coupled to the central feed point, the feed line including a feed conductor and a ground conductor, and at least two dipole radiators coupled to the feed line, each dipole radiator comprising a first dipole arm that is coupled to the feed conductor and a second dipole arm that is coupled to the ground conductor. A first length of a first of the dipole radiators is different than a second length of a second of the dipole radiators. Each of the dipole radiators is fed in-phase.

19 Claims, 8 Drawing Sheets

WIDEBAND ANTENNAS AND ACCESS POINTS INCLUDING SUCH ANTENNAS

CROSS-REFERENCE TO RELATED APPLICATION

The present application claims priority under 35 U.S.C. § 119 to U.S. Provisional Patent Application Ser. No. 63/223,723, filed Jul. 20, 2021, the entire content of which is incorporated herein by reference as if set forth in its entirety.

BACKGROUND

The present invention generally relates to radio communications and, more particularly, to access points suitable for use in wireless local area networks and antennas for such access points A wireless local area network ("WLAN") refers to a network that operates in a limited area (e.g., within a home, school, store, campus, shopping mall, etc.) that interconnects two or more electronic devices using wireless radio frequency ("RF") communications. Electronic devices belonging to users ("clients") of a WLAN, such as smartphones, computers, tablets, printers, appliances, televisions, lab equipment and the like ("client devices"), can communicate with each other and with external networks such as the Internet over the WLAN. Since wireless communications are used, portable client devices can be moved throughout the area covered by the WLAN and remain connected to the network. Most WLANs operate under a family of standards promulgated by the Institute of Electrical and Electronics Engineers (IEEE) that are referred to as the IEEE 802.11 standards. WLANs operating under the IEEE 802.11 family of standards are commonly referred to as WiFi networks. Client devices that include a networking subsystem that includes a WiFi network interface can communicate over WiFi networks.

A Win network includes one or more access points (also referred to as hotspots) that are typically installed at fixed locations throughout the area covered by the WiFi network. The WiFi network can include a single access point that provides coverage in a very limited area or may include tens, hundreds or even thousands of access points that provide in-building and/or outdoor coverage to a large campus or region. Client devices communicate with each other and/or with wired devices that are connected to the WiFi network through the access points. The access points may be connected to each other and/or to one or more controllers through wired and/or wireless connections. The Win network typically includes one or more gateways that may be used to provide Internet access to the client devices.

Early WiFi standards supported communication in the 2.401-2.484 GHz frequency range (herein "the 2.4 GHz frequency band"). Later WiFi standards supported communication in the 5.170-5.835 GHz frequency range (herein "the 5 GHz frequency band"). Most modern access points support communications in both the 2.4 GHz and 5 GHz frequency bands, and have a radio for each frequency band. Recently, the United States Federal Communications Commission voted to open spectrum in the 5.935-7.125 GHz frequency range, which is referred to herein as "the 6 GHz frequency band," for use in WiFi applications, and many other countries are likewise in the process of allowing WiFi networks to operate in the 6 GHz frequency band. Access points that support WiFi communications in the 6 GHz frequency band will include a total of three radios, namely one for each of the 2.4 GHz, 5 GHz and 6 GHz frequency bands. Such access points may be referred to herein as "tri-band" access points.

SUMMARY

Pursuant to embodiments of the present invention, antennas are provided that comprise a printed circuit board that includes a central feed point and a plurality of antenna elements formed therein, the antenna elements extending radially from the central feed point. Each antenna element comprises a feed line that is coupled to the central feed point, the feed line including a feed conductor and a ground conductor and at least two dipole radiators coupled to the feed line, each dipole radiator comprising a first dipole arm that is coupled to the feed conductor and a second dipole arm that is coupled to the ground conductor. A first length of a first of the dipole radiators is different than a second length of a second of the dipole radiators, and each of the dipole radiators is fed in-phase.

In some embodiments, the printed circuit board may be a two-metal-layer printed circuit board having a first metal layer and a second metal layer. For example, the feed conductor and the first dipole arm of each dipole radiator of each of the antenna elements may be formed in the first metal layer and the ground conductor and the second dipole arm of each dipole radiator of each of the antenna elements may be formed in the second metal layer.

In some embodiments, a first of the antenna elements may include at least three dipole radiators, where each dipole radiator has a different length. A second of the antenna elements may also include at least three dipole radiators, where a length of each of the dipole radiators of a first of the antenna elements is equal to a length of a respective one of the dipole radiators of the second of the antenna elements.

In some embodiments, the antenna may include a total of three antenna elements, and each antenna element may extend from the central feed point in a direction that is offset by 120° from the direction that the other two antenna elements extend from the central feed point.

In some embodiments, the central feed point may be a power divider.

In some embodiments, each antenna element may include a total of two dipole radiators.

The antenna may be provided in combination with an access point that includes an access point printed circuit board that has radio circuitry mounted thereon. In such embodiments, the printed circuit board may be mounted on the access point printed circuit board and may extend in parallel to the access point printed circuit board.

In some embodiments, the first of the dipole radiators of a first of the antenna elements may be farther from the central feed point than is the second of the dipole radiators of the first of the antenna elements.

In some embodiments, the at least two dipole radiators may comprise an outermost dipole radiator and an innermost dipole radiator, the outermost dipole radiator positioned farther from the central feed point than the innermost dipole radiator and the outermost dipole radiator being longer than the innermost dipole radiator. In some embodiments, the antenna may further comprising a plurality of directors, where each director is part of a respective one of the antenna elements, the directors radially arranged about the central feed point and positioned outwardly of the respective outermost dipole radiators. In some embodiments, each director may be shorter than a respective one of the outermost dipole radiators, and each director may be coupled to a ground reference through a respective switch. In other embodiments, the antenna may further comprise a plurality of reflectors, where each reflector is part of a respective one of the antenna elements, the reflectors radially arranged about the central feed point and positioned outwardly of the respective outermost dipole radiators. In some embodiments, each reflector may be longer than the outermost dipole radiator of the antenna element that the reflector is part of, and each reflector may be coupled to a ground reference through a respective switch.

Pursuant to further embodiments of the present invention, antennas are provided that comprise a plurality of antenna elements extending radially from a central region. Each antenna element comprises a feed line that is coupled to a power divider, the feed line including a feed conductor and a ground conductor and at least two dipole radiators coupled to the feed line, each dipole radiator comprising a first dipole arm that extends in a first direction from the feed line and a second dipole arm that extends in a second direction from the feed line that is different than the first direction. The feed conductor is coupled to each first dipole arm, and the ground conductor is coupled to each second dipole arm. A first length of a first of the dipole radiators is different than a second length of a second of the dipole radiators.

In some embodiments, the second direction is opposite the first direction. In some embodiments, a first of the antenna elements may include at least three dipole radiators, where each dipole radiator has a different length.

In some embodiments, a second of the antenna elements may also include at least three dipole radiators, and a length of each of the dipole radiators of the first of the antenna elements may be equal to a length of a respective one of the dipole radiators of the second of the antenna elements.

In some embodiments, the antenna may include a total of three antenna elements, and each antenna element may extend from the central region in a direction that is offset by 120° from the direction that the other two antenna elements extend from the central region.

In some embodiments, the antenna may be provided in combination with an access point that includes an access point printed circuit board that has radio circuitry mounted thereon, and the printed circuit board may be mounted on the access point printed circuit board and may extend in parallel with the access point printed circuit board.

In some embodiments, the first of the dipole radiators of a first of the antenna elements may be farther from the central region than is the second of the dipole radiators of the first of the antenna elements.

In some embodiments, the at least two dipole radiators may comprise an outermost dipole radiator and an innermost dipole radiator, and the outermost dipole radiator may be positioned farther from the central region than the innermost dipole radiator and the outermost dipole radiator may be longer than the innermost dipole radiator.

In some embodiments, the antenna may further comprise a plurality of directors, where each director is part of a respective one of the antenna elements, the directors radially arranged about the central region and positioned outwardly of the respective outermost dipole radiators. Each director may shorter than the outermost dipole radiator of the antenna element that the director is part of, and each director may be coupled to a ground reference through a respective switch. In other embodiments, the antenna may further comprise a plurality of reflectors, where each reflector is part of a respective one of the antenna elements, the reflectors radially arranged about the central region and positioned outwardly of the respective outermost dipole radiators. Each reflector may be longer than the outermost dipole radiator of the antenna element that the reflector is part of, and each reflector may be coupled to a ground reference through a respective switch.

BRIEF DESCRIPTION OF THE DRAWINGS

Like reference numerals refer to corresponding parts throughout the drawings. Moreover, multiple instances of the same part may be designated by a common prefix separated from an instance number by a dash.

DETAILED DESCRIPTION

Figure 1:
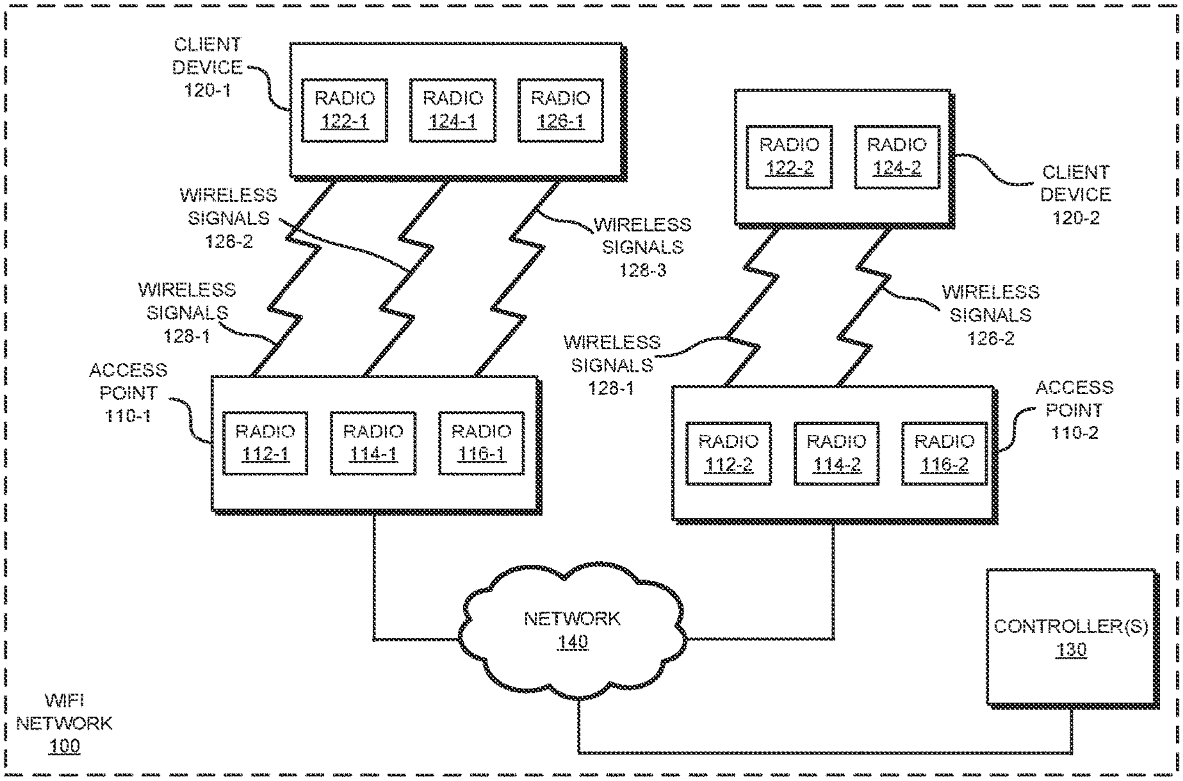
FIG. 1 is a block diagram illustrating an example of a simplified WiFi network.

As discussed above, WiFi networks are now authorized to operate in the 6 GHz frequency band (5.935-7.125 GHz). With the opening of the 6 GHz frequency band for WiFi communications, tri-band WiFi access points are being developed that will include a first radio that operates in the 2.4 GHz frequency band) (2.401-2.484 GHz), a second radio that operates in the 5 GHz frequency band (5.170-5.835 GHz), and a third radio that operates in the 6 GHz frequency band. In the United States, the 5.350-5.490 GHz frequency band is not available for WiFi communications. Herein, references to the "full" 5 GHz frequency band refer to at least the combination of the 5.170-5.335 and 5.490-5.835 GHz frequency ranges, and may also include the 5.350-5.490 GHz frequency range.

The 6 GHz frequency band is significantly wider than either the 2.4 GHz frequency band or the 5 GHz frequency band in terms of both physical bandwidth and in terms of "fractional bandwidth" (i.e., the ratio of the difference between the highest and lowest frequencies in the operating frequency band to the center frequency of the operating frequency band. In particular, the 2.4 GHz frequency band has a physical bandwidth of 83 MHz and a fractional bandwidth of 3.4%. The 5 GHz frequency band has a physical bandwidth of 665 MHz and a fractional bandwidth of 12.1%. In contrast, the 6 GHz frequency band has a physical bandwidth of 1200 MHz and a fractional bandwidth of 18.4%.

Antennas that operate in the 6 GHz frequency band will need to be developed for tri-band access points. Because of the larger bandwidth requirements, it may not be possible to simply rescale existing access point antennas to resonate in the 6 GHz frequency band, as such re-scaled antennas may not have a sufficient operating bandwidth to cover the wider 6 GHz frequency band. Moreover, while wider bandwidth antenna designs are known in the art, size and/or cost considerations may be prohibitive with respect to various wideband antenna designs.

Additionally, there may be specific applications in which access points will deploy antennas that are designed to operate in both the 6 GHz frequency band as well as some or all of the 5 GHz frequency band. For example, U.S. Provisional Patent Application Ser. No. 63/209,130, filed Jun. 10, 2021 ("the '130 application"), discloses tri-band access points that can be operated in one of two modes. These access points have a first radio that is configured to operate in the 2.4 GHz frequency band, a second radio that is configured to operate in the 5 GHz frequency band and a third radio that is configured (in hardware and/or software) to operate in either a portion of the 5 GHz frequency band or in the 6 GHz frequency band. In the first mode, the tri-band access point operates as a true tri-band access point by configuring the third radio to operate in the 6 GHz frequency band. In the second mode, the first radio operates in the 2.4 GHz frequency band, the second radio operates in the 5.170-5.350 GHz sub-band of the 5 GHz frequency band, and the third radio operates in the 5.490-5.835 GHz sub-band of the 5 GHz frequency band. The antennas coupled to the third radio in such access points may need to operate over the 5.490-7.125 GHz frequency band to support operation in both modes. Thus, such antennas need to operate over a physical bandwidth of 1635 MHz, which corresponds to a fractional bandwidth of 25.9%.

As another example, in some cases it may be desirable to use diplexed antennas to support operation in both the 5 GHz and 6 GHz frequency bands. Such antennas will thus need to operate over the 5.170-7.125 GHz frequency range, which corresponds to a physical bandwidth of 1955 MHz and to a fractional bandwidth of 31.8%

Further complicating matters, in some cases it may also be necessary that the radiation pattern or "antenna beam" generated by the antenna be able to be dynamically altered, using techniques that focus the radiation pattern in desired directions to provide increased gain. This may be accomplished, for example, by using pattern-shaping elements such as directors or reflectors to focus the RF energy in one or more directions. Thus, antennas are needed that are small, inexpensive, have a wide operating bandwidth and are suitable for use with directors, reflectors or other pattern shaping elements.

Pursuant to embodiments of the present invention, wideband antennas are provided that are capable of operating in the 6 GHz band or even in the combination of the 6 GHz band and some or all of the 5 GHz band. Tri-band access points that include such antennas are also provided.

In some embodiments, the wideband antennas may be horizontally polarized antennas that include multiple antenna elements that are arranged in a so-called "Alford loop" in which the antenna elements are arranged radially about a center feed point that feeds all of the antenna elements. The Alford loop may include, for example, three or four antenna elements. Each antenna element may comprise a modified log periodic dipole array that includes a plurality of dipole radiators that are each fed from the base of the antenna element (i.e., the portion of the antenna element closest to the feed point) and that are all fed in-phase with respect to each other. The number of dipole radiators included in each antenna element may be adjusted to meet the bandwidth requirements for the antenna.

Before describing example embodiments of the present invention in detail, it is helpful to describe the environment in which the antennas and access points according to embodiments of the present invention may be used.

FIG. 1 is a block diagram illustrating a simplified WiFi network 100 in which the antennas and access points according to embodiments of the present invention may be used. As shown in FIG. 1, the WiFi network 100 includes one or more access points 110, one or more client devices 120, and one or more optional controllers 130. The access points 110 may communicate with one or more of the client devices 120 using wireless communication that is compatible with an IEEE 802.11 standard. At least some of the access points 110 may be tri-band access points that include three access point radios. The access point radios may include first access point radios 112 that operate in the 2.4 GHz frequency band, second access point radios 114 that operate in the 5 GHz frequency band, and third access point radios 116 that are capable of operating in the 6 GHz frequency band or in both the 6 GHz frequency band and some or all of the 5 GHz frequency band. The client devices 120 may also include one or more client radios 122, 124, 126. The client radios may include first client radios 122 that operate in the 2.4 GHz frequency band, second client radios 124 that operate in the 5 GHz frequency band, and third client radios 126 that operate in the 6 GHz frequency band. Some client devices 120 may include less than all of the first, second and third client radios 122, 124, 126, as shown in FIG. 1 (i.e., client device 120-2 only includes a 2.4 GHz client radio 122-2 and a 5 GHz client radio 124-2).

The access points 110 may also communicate with the one or more optional controllers 130 via a network 140, which may comprise, for example, the Internet, an intra-net and/or one or more dedicated communication links. It will also be appreciated that some access points 110 may only be connected to the network 140 through other access points 110 (e.g., in a mesh network implementation). Note that the optional controllers 130 may be at the same location as the other components in WiFi network 100 or may be located remotely (e.g., cloud based controllers 130). The access points 110 may be managed and/or configured by the controllers 130. The access points 110 may communicate with the controller(s) 130 or other services using wireless communications and/or using a wired communication protocol, such as a wired communication protocol that is compatible with an IEEE 802.3 standard (which is sometimes referred to as "Ethernet"). The access points 110 may provide the client devices 120 access to the network 140. The access points 110 may be physical access points or may be virtual access points that are implemented on a computer or other electronic device. While not shown in FIG. 1, the WiFi network 100 may include additional components or electronic devices, such as, for example, a router.

The access points 110 and the client devices 120 may communicate with each other via wireless communication. The access points 110 and the client devices 120 may wirelessly communicate by: transmitting advertising frames on wireless channels, detecting one another by scanning wireless channels, exchanging subsequent data/management frames (such as association requests and responses) to establish a connection and configure security options (e.g., Internet Protocol Security), transmit and receive frames or packets via the connection, etc.

As described further below with reference to FIG. 13, the access points 110, client devices 120 and/or the controllers 130 may include subsystems, such as a networking subsystem, a memory subsystem and a processor subsystem. The networking subsystems of the access points 110 may include the above-described access point radios 112, 114, 116, and the networking subsystems of the client device 120 may include the above-described client radios 122, 124, 126.

As can be seen in FIG. 1, wireless signals 128-1 (represented by a jagged line) are transmitted from the 2.4 GHz radio 122-1 in client device 120-1. These wireless signals 128-1 are received by the 2.4 GHz radio 112-1 in at least one of the access points 110, such as access point 110-1. Likewise, wireless signals 128-2 are transmitted from the 5 GHz radio 124-1 in client device 120-1, and may be received by the 5 GHz radio 114-1 of access point 110-1, and wireless signals 128-3 are transmitted from the 6 GHz radio 126-1 in client device 120-1, and may be received by the 6 GHz radio 116-1 of access point 110-1. The wireless signals 128-1, 128-2, 128-3 may comprise frames or packets that are received by access point 110-1. It will be appreciated that wireless signals 128-1, 128-2, 128-3 may flow in both directions, namely from a client device 120 to an access point 110, and from an access point 110 to a client device 120.

The communication between client device 120-1 and access point 110-1 may be characterized by a variety of performance metrics, including, for example, a data rate, throughput (i.e., the data rate for successful transmissions), an error rate (such as a retry or resend rate), a signal-to-noise ratio, a ratio of a number of bytes successfully communicated during a time interval to an estimated maximum number of bytes that can be communicated in the time interval (the latter of which is sometimes referred to as the "capacity" of a communication channel or link), and/or a ratio of an actual data rate to an estimated data rate (which is sometimes referred to as "utilization").

As discussed above, with the 6 GHz frequency band now available for WiFi communications, tri-band WiFi access points are being deployed that support WiFi communications in all three of the 2.4 GHz, 5 GHz and 6 GHz frequency bands. These tri-band access points may include three radios in order to support WiFi communications in the three different frequency bands. Most conventional access point antennas, however, are not sufficiently broadband to support service in both the 6 GHz frequency band and at least a portion of the 5 GHz frequency band. This is particularly true with respect to horizontally polarized antennas, as the underlying ground plane "shorts out" the horizontally polarized antenna. Thus, new horizontally polarized antenna designs for access points are needed. Preferably the new antennas will be small, inexpensive and easy to implement, and support fractional bandwidths of 25% or more.

Figure 2:
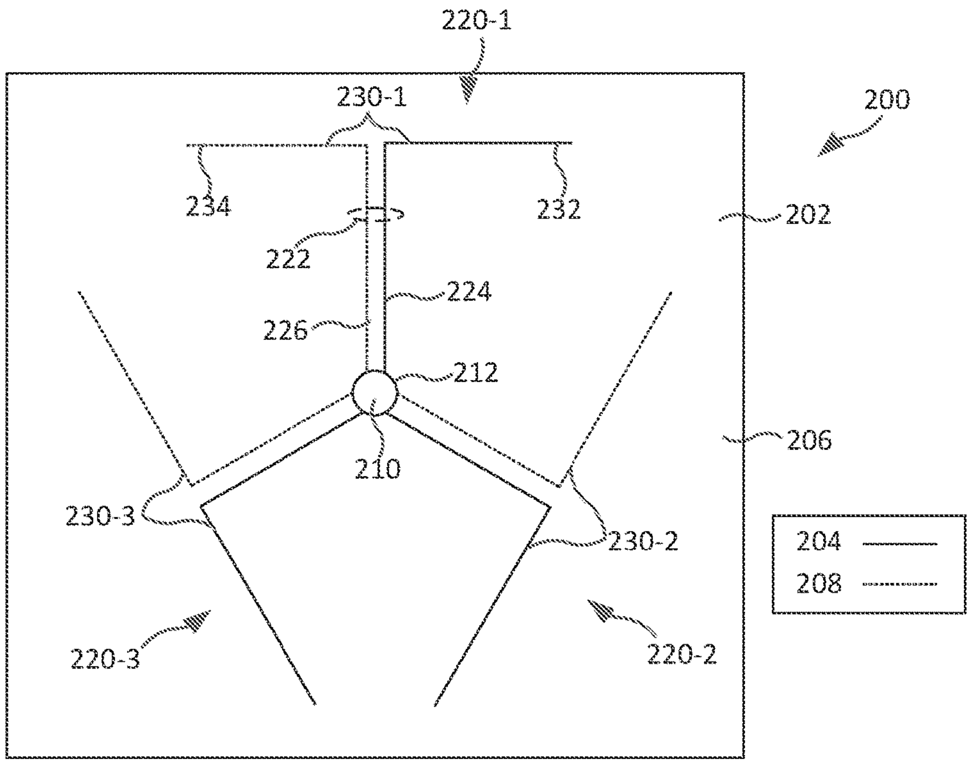
FIG. 2 is a schematic plan view of a conventional horizontally polarized antenna for an access point.

FIG. 2 is a schematic plan view of a conventional horizontally polarized antenna 200 for an access point such as one of the access points 110 of FIG. 1. As shown in FIG. 2, the antenna 200 is implemented on a printed circuit board 202 that includes a dielectric substrate 206 that has a top metal layer 204 formed on a top surface thereof and a bottom metal layer 208 formed on a bottom surface thereof. The antenna 200 includes three antenna elements 220-1, 220-2, 220-3 that are radially positioned about a central feed point 210 in an Alford loop arrangement. Each antenna element 220 includes a feed line 222 and a dipole radiator 230. The feed line 222 includes a feed conductor 224 that is formed in the top metal layer 204 and a ground conductor 226 that is formed in the bottom metal layer 208. As shown in the legend, the metal forming the top metal layer 204 is shown in FIG. 2 using solid lines, while the metal forming the bottom metal layer 208 is shown in FIG. 2 using dotted lines. Each dipole radiator 230 includes a first dipole arm 232 that is formed in the top metal layer 204 and a second dipole arm 234 that is formed in the bottom metal layer 208. The feed conductor 224 of a respective one of the feed lines 222 is coupled to the first dipole arm 232 of its associated dipole radiator 230 and the ground conductor 226 of the feed line 222 is coupled to the second dipole arm 234 of the associated dipole radiator 230. Each dipole arm 232, 234 may have a length of about ¼λ where λ is the wavelength corresponding to the center frequency of the operating frequency band of the antenna 200. Thus, each dipole radiator 230 may have a length of about ½λ.

The central feed point 210 may be coupled to an RF transmission line (not shown) such as, for example, a coaxial cable or a microstrip transmission line. The central feed point 210 may act as a power divider that divides an input RF signal into three sub-components that are fed to the dipole radiators 230 via the respective feed lines 222. All three antenna elements 220 are fed in-phase and with equal amplitude signals (i.e., the three sub-components of the RF signal output by the power division may have equal amplitudes and the same phase). The central feed point 210 may comprise a first pad 212 that is formed in the top metal layer 204 and a second annular pad (not visible in FIG. 2) that is formed in the bottom metal layer 208.

The antenna 200 may be mounted above a ground plane (e.g., mounted a distance of ¼λ above the ground plane) such as a ground plane of a main printed circuit board of an access point. Since the three antenna elements 220 are fed in-phase with equal amplitude sub-components of an RF signal, the radiation pattern or "antenna beam" generated by antenna 200 is symmetric in the azimuth plane at low elevation angles, which is desirable. Unfortunately, however, antenna 200 only has a fractional bandwidth of about 15%. As such, it cannot provide coverage to the full 6 GHz frequency band (at least without enhanced return loss at the edges of the frequency band), let alone cover the 6 GHz frequency band and at least a portion of the 5 GHz frequency band.

Wider bandwidth antennas are known in the art. One such antenna is the so-called log periodic dipole array antenna ("LPDA antenna"). An LPDA antenna can support much larger fractional bandwidths than single dipole antennas (such as the Alford loop antenna of FIG. 2). However, LPDA antennas are more complicated structures that have increased size and manufacturing costs, and which may not lend themselves well to printed circuit board based implementations.

Figure 3:
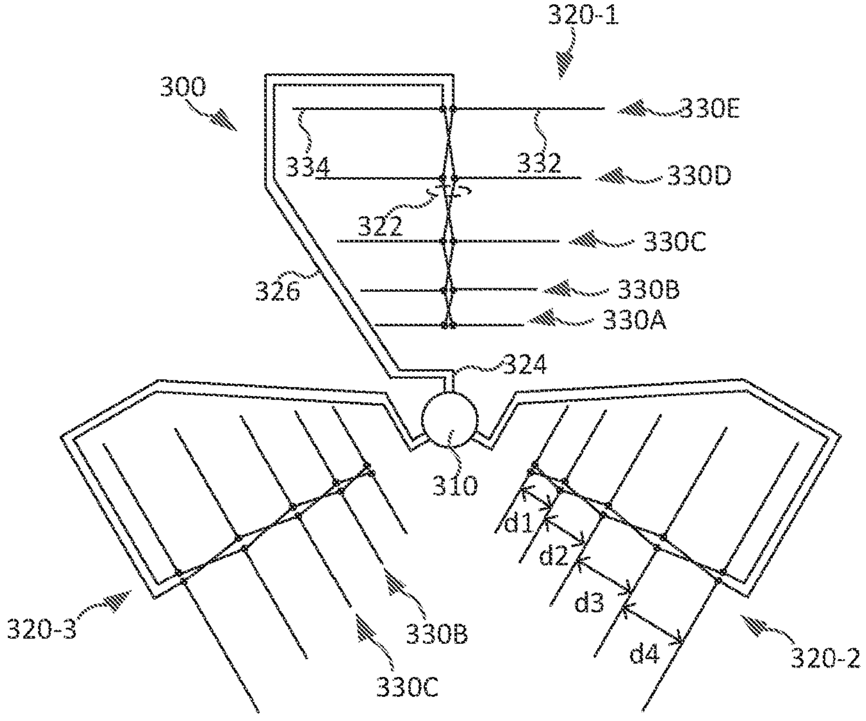
FIG. 3 is a schematic plan view of a conventional log periodic dipole antenna.

FIG. 3 is a schematic plan view of a conventional LPDA antenna 300. As shown in FIG. 3, the LPDA antenna includes three LPDA antenna elements 320-1, 320-2, 320-3 that are arranged in an Alford loop so that each LPDA antenna element 320 extends radially outward from a central feed point 310. The central feed point 310 may be coupled to an RF transmission line (not shown) such as, for example, a coaxial cable or a microstrip transmission line. The central feed point 310 may act as a power divider that divides an input RF signal into three sub-components that are fed to the three antenna elements 320-1, 320-2, 320-3 via three respective feed lines 322.

Each LPDA antenna element 320 includes a feed line 322 and a plurality of dipole radiators 330A, 330B, 330C, 330D, 330E (collectively "the dipole radiators 330"). The feed line 322 includes a feed conductor 324 and a ground conductor 326. Each dipole radiator 330 includes a first dipole arm 332 and a second dipole arm 334. Focusing on the first antenna element 320-1, the first dipole arms 332 all extend in a first direction (e.g., to the right) from the feed line 322 and the second dipole arms 334 all extend in a second, opposed direction (e.g., to the left) from the feed line 322. It can be seen that all of the first dipole arms 332 have different lengths, with the lengths of the first dipole arms 332 increasing with increasing distance from the central feed point 310. Similarly, all of the second dipole arms 334 have different lengths, with the lengths of the second dipole arms 334 increasing with increasing distance from the central feed point 310. Each first dipole arm 332 is the same length as one of the second dipole arms 334, and each pair of a first dipole arm 332 and second dipole arm 334 that have the same length forms a respective one of the dipole radiators 330. The dipole radiators 330 are arranged in order of descending length, with the shortest dipole radiator 330 (here dipole radiator 330A) being closest to the central feed point 310 and the longest dipole radiator 330E being the farthest from the central feed point 310. The dipole radiators 330 are spaced apart from one another by varying distances dl through d4, where the distances dl through d4 are proportional to the lengths of the dipole radiators 330

At least one of the dipole radiators 330 (e.g., dipole radiator 330A) may have a length that is less than ½λ, where λ is the wavelength corresponding to the center frequency of the operating frequency band of the antenna 300, and another of the dipole radiators 330 (e.g., dipole radiator 330E) may have a length that is more than ½λ. Typically, each dipole radiator 330 will have a length that is one half of a wavelength of a frequency within the operating frequency band of the LPDA antenna 300. By including a plurality of dipole radiators 330 in each LPDA antenna element 320, each LPDA antenna element 320 will be resonant at a plurality of different frequencies within the operating frequency band. RF signals input to the LPDA antenna elements 320 will tend to flow to the dipole radiators 330 that are resonant in the frequency range of the input RF signal. Since the LPDA antenna elements 320 resonate at multiple frequencies, they may have an extended operating frequency band. Moreover, the operating frequency range of an LPDA antenna 300 may be increased by adding more dipole radiators 300 to each LPDA antenna element 320 thereof.

Unfortunately, the feed arrangement for the LPDA antenna 300 of FIG. 3 includes two complications.

First, as shown in FIG. 3, adjacent dipole radiators 330 in each LPDA antenna element 320 (e.g., dipole radiators 330A and 330B) are fed 180° out of phase. This is accomplished by alternating the connections between the feed and ground conductors 324, 326 and the first and second dipole arms 332, 334 of each adjacent dipole radiator 330. For example, as shown in FIG. 3, the feed conductor 324 is connected to the first dipole of arm 332 of the first dipole radiator 330A and the ground conductor 326 is connected to the second dipole arm 334 of the first dipole radiator 330A. These connections are then reversed when feeding the second dipole radiator 330B so that the feed conductor 324 is connected to the second dipole of arm 334 of the second dipole radiator 330B and the ground conductor 326 is connected to the first dipole arm 332 of the second dipole radiator 330B. The feed arrangement continues to alternate in this fashion for feeding each of the dipole radiators 330. Unfortunately, such a feed arrangement is more difficult to implement on a printed circuit board, requiring plated through holes so that the feed and ground conductors can electrically connect to dipole arms 332, 334 that are implemented in different metal layers of the printed circuit board. Such plated through holes are difficult to design, narrow the bandwidth, and/or result in impedance mismatches that can reduce the performance of the antenna.

Second, as is also shown in FIG. 3, the dipole radiators 330 of each LPDA antenna element 320 are fed from the distal end of the antenna element 320 (i.e., the end that is farthest from the central feed point 310). If the LPDA antenna 300 is implemented on a printed circuit board, it may be difficult to route each feed line 322 from the center of the printed circuit board based antenna element to the outer periphery of the printed circuit board so that the longest dipole radiator 330 of each LPDA antenna element 320 is fed first. To accomplish this, it may be necessary to add additional layers to the printed circuit board and/or to implement RF transmission line crossovers on the printed circuit board, both of which increase cost and potentially reduce performance. The longer feed lines 322 required to feed the antenna elements 320 from their distal ends also result in increased insertion loss.

Yagi antennas are another known antenna that are commonly used in wireless communications systems. A Yagi antenna is a center-fed, half wave dipole antenna that also includes a plurality of non-driven elements that are positioned in parallel to the driven dipole radiator. The non-driven elements may be implemented as straight rods or wires and may comprise reflectors or directors. By "non-driven" it is meant that the element is not connected to an RF signal source such as a feed line. A reflector refers to a non-driven element that is placed behind the driven element that has a length that is slightly longer than the length of the driven element. One or more directors are positioned in front of the driven element, where the length of each director is slightly less than the length of the driven element.

Figure 4:
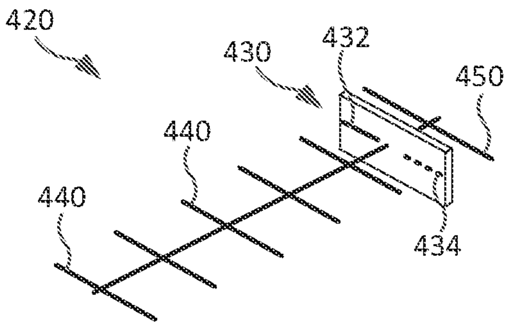
FIG. 4 is a schematic perspective view of a conventional Yagi antenna element.

FIG. 4 illustrates a conventional Yagi antenna element 420. As shown in FIG. 4, the Yagi antenna element 420 includes a driven dipole radiator 430 that is fed by a feed line (not shown). The driven dipole radiator 430 includes first and second dipole arms 432, 434 that are connected to a feed conductor and a ground conductor, respectively, of the feed line. The Yagi antenna element 420 further includes a reflector 450 and the plurality of directors 440. The reflector 450 and directors 440 are electrically isolated from the driven dipole radiator 430 and the feed line.

Embodiments of the present invention will now be described in further detail with reference to FIGS. 5-13.

Figure 5:
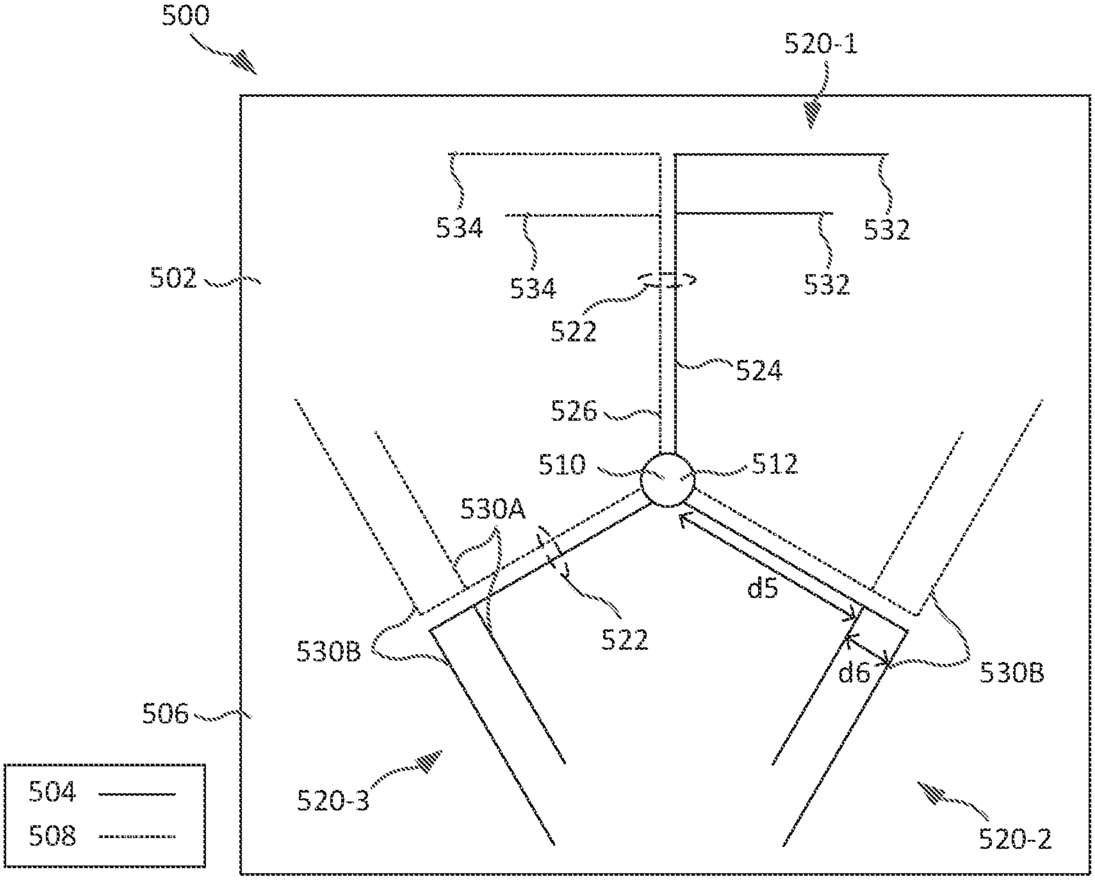
FIG. 5 is a schematic plan view of a horizontally polarized antenna according to embodiments of the present invention.

Pursuant to embodiments of the present invention, antennas are provided that may combine different aspects of an LPDA antenna and a Yagi antenna. FIG. 5 is a schematic plan view of one such antenna 500 according to embodiments of the present invention. The antenna 500 may be used, for example, to implement one or more of the antennas of an access point, such as one of the access points 110 of FIG. 1.

As shown in FIG. 5, the antenna 500 is implemented on a printed circuit board 502 that includes a dielectric substrate 506 that has a top metal layer 504 formed on a top surface thereof and a bottom metal layer 508 formed on a bottom surface thereof. The antenna 500 includes three antenna elements 520-1, 520-2, 520-3 that are radially arranged about a central feed point 510 in an Alford loop arrangement. Each antenna element 520 includes a feed line 522 and a pair of dipole radiators 530A, 530B. The dipole radiators 530A, 530B may extend generally in parallel to each other. Each feed line 522 includes a feed conductor 524 that is formed in the top metal layer 504 and a ground conductor 526 that is formed in the bottom metal layer 508. The characteristic impedance of each feed line 522 may be N*X, where N is the number of antenna elements 520 (here three) and X is the characteristic impedance (e.g., in ohms) of the RF transmission line (not shown) that is connected to the central feed point 510 (e.g., 50 ohms).

Each dipole radiator 530A, 530B includes a first dipole arm 532 that is formed in the top metal layer 504 and a second dipole arm 534 that is formed in the bottom metal layer 508. The first dipole arms 532 of a given antenna element 520 all extend in parallel to each other in a first direction (e.g., to the right) from the feed line 522 and the second dipole arms 534 thereof all extend in parallel to each other in a second, opposed direction (e.g., to the left) from the feed line 522. The feed conductor 524 of the feed line 522 is coupled to each first dipole arm 532 and the ground conductor 526 of the feed line 522 is coupled to each second dipole arm 534.

The central feed point 510 may be coupled to an RF transmission line (not shown) such as, for example, a coaxial cable or a microstrip transmission line. The central feed point 510 may act as a power divider that divides an input RF signal into three sub-components that are fed to the three antenna elements 520 via the respective feed lines 522. All three antenna elements 520 are fed in-phase and with equal amplitude signals (i.e., the three sub-components of the RF signal output by the power divider may have equal amplitudes and the same phase). The central feed point 510 may comprise a first pad 512 that is formed in the top metal layer 504 and a second annular pad (not shown) that is formed in the bottom metal layer 508. It should be noted that references to being fed "in-phase" do not mean that the RF currents entering each dipole radiator 530 will have the exact same phase. Those of skill in the art will recognize that due to the fact that each dipole radiator 530 is connected to a different point on one of the feed lines 522 the phase will differ by a small amount based on the phase change that occurs as the RF signal traverses each segment of a feed line 522. Thus, it will be appreciated that the term "in-phase" is used to indicate that the feed conductor 524 and ground conductor 526 are not reversed for feeding adjacent dipole radiators 530 as is the case in the LPDA antenna 300 of FIG. 3.

The first and second dipoles arms 532, 534 forming the dipole radiator 530A of each antenna element 520 are the same length. Each dipole radiator 530A may have a length that is less than ½λ, where λ is the wavelength corresponding to the center frequency of the operating frequency band of the antenna 500. The first and second dipoles arms 532, 534 forming each dipole radiator 530B are the same length, which is longer than the length of the dipole arms 532, 534 forming each dipole radiator 530A. Each dipole radiator 530B may have a length that is more than ½λ. Typically, each dipole radiator 530 will have a length that is one half of a wavelength of a frequency within the operating frequency band of the LPDA antenna 500. The dipole radiators 530 are arranged in order of descending length, with the shortest dipole radiator 530 (here dipole radiator 530A) being closest to the central feed point 510 and the longest dipole radiator 530 (here dipole radiator 530B) being the farthest from the central feed point 510. By including two dipole radiators 530A, 530B in each antenna element 520, each antenna element 520 will be resonant at two different frequencies within the operating frequency band. RF signals input to the antenna elements 520 will tend to flow to the dipole radiator 530A, 530B that is resonant in the frequency range of the input RF signal. Since the antenna elements 520 resonate at multiple frequencies, they may have an extended operating frequency band.

The distance d5 between the first dipole radiator 530A and the central feed point may be about 0.1 k (e.g., between 0.05 k and 0.2 k in example embodiments). The distance d6 between the first dipole radiator 530A and the second dipole radiator 530B may be about 0.05, (e.g., between 0.03 k and 0.09 k in example embodiments).

As can be seen in FIG. 5, the dipole radiators 530A, 530B of each antenna element 520 are fed in-phase. This eliminates the need for reversing the feed and ground conductors 524, 526 when feeding adjacent dipole radiators 520 as was the case with the LPDA antenna 300 of FIG. 3. Additionally, the dipole radiators 530 are fed from the base so that the dipole radiator closest to the central feed point 510 is fed first and the dipole radiator 530B that is farthest from the central feed point 510 is fed last. Thus, the antenna 500 may be better suited for a printed circuit board implementation than is a conventional LPDA antenna.

The antenna 500 may be mounted above a ground plane (e.g., mounted a distance of ¼λ above the ground plane) such as a ground plane of a main printed circuit board of an access point. Since the three antenna elements 520 are fed in-phase with equal amplitude sub-components of an RF signal, the radiation pattern or "antenna beam" generated by antenna 500 is symmetric in the azimuth plane at low elevation angles, which is desirable.

The antenna 500 may have bandwidth of about 2 GHz at a center frequency of 6 GHz, which corresponds to a fractional bandwidth of about 33.3%. As such, it can provide coverage to both the full 6 GHz frequency band as well as to at least a portion of the 5 GHz frequency band. Moreover, the bandwidth can be increased further by adding additional dipole radiators 530 to each antenna element, as will be discussed below.

Thus, the antenna 500 comprises a plurality of antenna elements 520-1 through 520-3 that extend radially from the central feed point 510. Each antenna element 520 may comprise a feed line 522 that is coupled to the central feed point 510, the feed line 522 including a feed conductor 524 and a ground conductor 526, and at least two dipole radiators 530A, 530B that are coupled to the feed line 522. Each dipole radiator 530 includes a first dipole arm 532 that is coupled to the feed conductor 524 and a second dipole arm 534 that is coupled to the ground conductor 526. A first length of the first dipole radiator 530A is different than a second length of the second dipole radiator 530B. Each of the dipole radiators 530A, 530B is fed in-phase. Each antenna element 520 may extend from the central feed point 510 in a direction that is offset by 120° from the direction that the other two antenna elements 520 extend from the central feed point 510.

The antenna 500 may be implemented in a printed circuit board 502 in some embodiments. The printed circuit board 502 may be a two-metal-layer printed circuit board having a first metal layer 504 and a second metal layer 508 that are formed on opposed surfaces of a dielectric substrate 506.

The feed conductor 524 and first dipole arm 532 of each dipole radiator 530A, 530B of each of the antenna elements 520-1 through 520-3 may be formed in the first metal layer 504 and the ground conductor 526 and the second dipole arm 534 of each dipole radiator 530A, 530B of each of the antenna elements 520-1 through 520-3 may be formed in the second metal layer 508.

As discussed above, antennas for WiFi access points are commonly configured to generate antenna beams that provide omnidirectional coverage in the azimuth plane. This may ensure that the access point may provide service to users in all directions. However, when the access point is communicating with a particular user, it may be desirable to modify the antenna beam so that higher antenna gain is provided in the direction of the user, as this may allow higher data rates to be supported. One known technique for shaping antenna beams in this fashion is to use pattern shaping elements such as directors or reflectors to modify the shape of the antenna beam.

In particular, directors and reflectors refer to conductive elements that may be selectively connected to a ground plane through an electronic switch such as a PIN diode. When not electrically connected to the ground plane (i.e., when the switch is open), a director or a reflector may be essentially invisible to a nearby antenna element, and will have little or no impact on the antenna beams formed by the antenna element. However, if the switch is closed so that the director or reflector is coupled to the ground plane, the director/reflector acts to shape the antenna beams generated by the nearby radiating element. Directors are pattern shaping elements that tend to distort the antenna beam in the direction of the director when the director is coupled to ground, thereby increasing the gain of the antenna beam in the direction of the director and decreasing the gain in other directions. Reflectors, in contrast, are elements that reflect some of the RF energy emitted by an antenna back toward the antenna, thereby increasing the gain of the antenna pattern in a direction opposite of a vector extending between the antenna and the reflector and reducing the gain in the direction of the reflector. The reflectors and directors may be metal objects having any shape that are placed near an antenna. More than one pattern shaping element may be located adjacent each antenna element. The access point may include a controller that is used to control the individual switches in order to selectively shape the antenna beams generated by the antenna elements of a given antenna.

Figure 6:
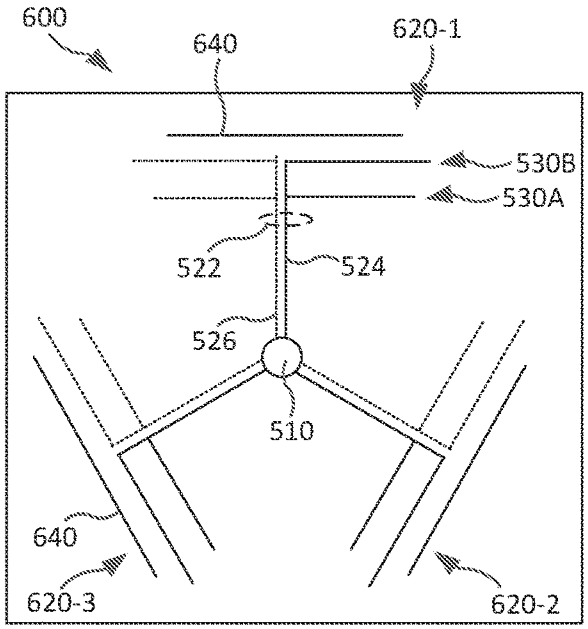
FIG. 6 is a schematic plan view of a horizontally polarized antenna according to further embodiments of the present invention in which each antenna element includes a director.

FIG. 6 is a schematic plan view of a horizontally polarized antenna 600 according to further embodiments of the present invention. As can be seen, antenna 600 is very similar to the antenna 500 described above with reference to FIG. 5. Accordingly, the discussion that follows will focus on the differences between the two antennas 500, 600. Like reference numerals in FIGS. 5-9 refer to like elements, and hence elements that have been described with respect to previous figures will not be described again in subsequent figures in the discussion that follows.

As can be seen by comparing FIGS. 5 and 6, the antenna 600 differs from antenna 500 in that each antenna element 620 of antenna 600 further includes a director 640 that is positioned at the distal end of the antenna element 620, outwardly of the outermost dipole radiator 530B. The director 640 may comprise, for example, a metal trace that may be formed on either or both metal layers 504, 508 of the printed circuit board 502. The director 640 may have a length that is less than a length of the longest dipole radiator 530B included in the antenna elements 620. In some embodiments, the length of the director 640 may be slightly shorter than the shortest dipole radiator 530A included in the antenna element 620. The director 640 may be positioned, for example, at a distance of less than 0.5 k outwardly of the outermost dipole radiator 530B. The director 640 may extend in parallel to the outermost dipole radiator 530B and may be coplanar with the outermost dipole radiator 530B in some embodiments. The director 640 of a first of the antenna elements 620 (e.g., antenna element 620-1) may tend to focus RF energy emitted by the dipole radiators 530 of the antenna element 620 in the direction of the director 640, thereby increasing the gain of the antenna element 620 in the general direction of the director 640 while decreasing the gain in the direction toward the central feed 510. More than one director 640 may be provided in other embodiments, with the second and subsequent directors 640 positioned outwardly of the first director 640, with each director 640 spaced apart from adjacent directors 640 by less than 0.5 k.

Figure 7:
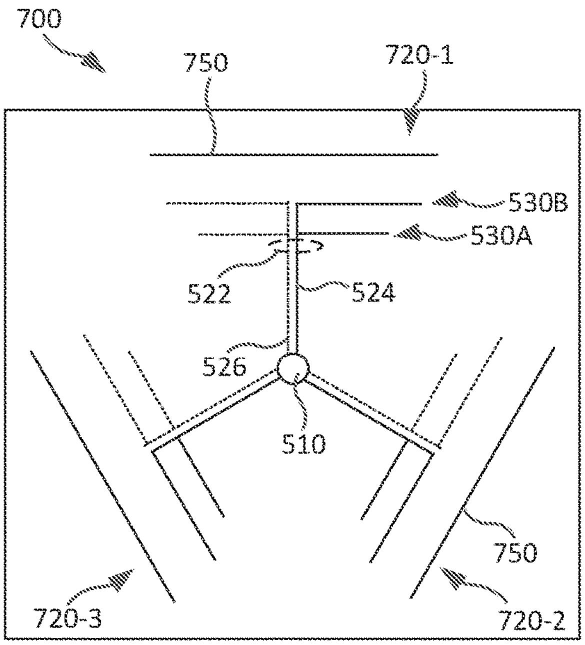
FIG. 7 is a schematic plan view of a horizontally polarized antenna according to additional embodiments of the present invention in which each antenna element includes a reflector.

FIG. 7 is a schematic plan view of a horizontally polarized antenna 700 according to additional embodiments of the present invention. As can be seen by comparing FIGS. 5 and 7, the antenna 700 differs from antenna 500 in that each antenna element 720 of antenna 700 further includes a reflector 750 that is positioned at the distal end of the antenna element 720, outwardly of the outermost dipole radiator 530B. The reflector 750 may comprise, for example, a metal trace that may be formed on either or both metal layers 504, 508 of the printed circuit board 500. The reflector 750 may have a length that is longer than a length of the longest dipole radiator 530B included in the antenna elements 720. The reflector 750 may be positioned, for example, at a distance of more than 0.5 k outwardly of the outermost dipole radiator 530B. The reflector 750 may extend in parallel to the outermost dipole radiator 530B and may be coplanar with the outermost dipole radiator 530B in some embodiments. The reflector 750 of a first of the antenna elements 520 (e.g., antenna element 520-1) may tend to reflect RF energy emitted by the dipole radiators 530 of the antenna element 520 back towards the central feed point 510, thereby increasing the gain of the antenna element 520 in the general direction of the central feed point 510, while decreasing the gain in the direction toward the reflector 750. More than one reflector 750 may be provided in other embodiments, with the second and subsequent reflectors 750 positioned outwardly of the first reflector 750, with each director 750 spaced apart from adjacent reflectors 750 by less than 0.5 k. The reflectors 750, like the directors 640 shown in FIG. 6, are positioned radially outward of their corresponding antenna elements 720, 620. The reflectors 750 "push" the RF energy radially inwardly across the antenna, whereas the directors 640 "pull" the RF energy radially outwardly. The different effects can be achieved by the size and locations of the directors 640 and reflectors with respect to their corresponding antenna elements 620, 720.

Figure 8:
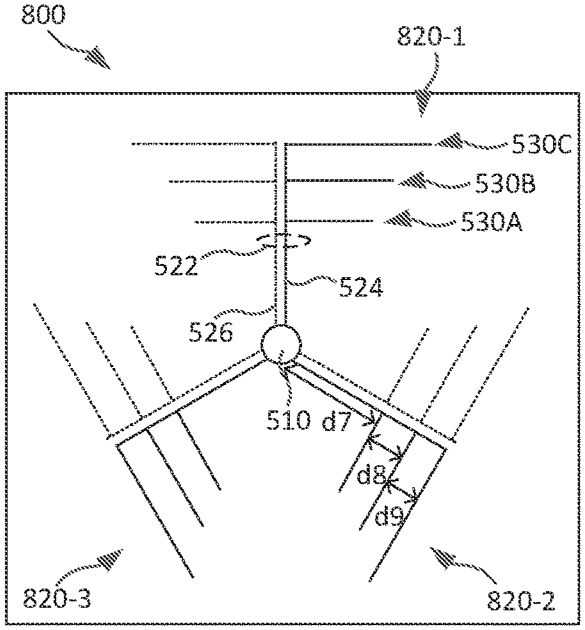
FIG. 8 is a schematic plan view of a horizontally polarized antenna according to additional embodiments of the present invention in which each antenna element includes three dipole radiators.

FIG. 8 is a schematic plan view of a horizontally polarized antenna 800 according to additional embodiments of the present invention. As can be seen by comparing FIGS. 5 and 8, the antenna 800 differs from antenna 500 in that each antenna element 820 includes three dipole radiators 530A through 530C, whereas the antenna elements 520 of antenna 500 only included two dipole radiators 530A, 530B. The dipole radiators 530 may extend generally in parallel to each other. The dipole radiators 530A, 530B, 530C may only extend "generally" in parallel with each other in some embodiments since the first and second dipole arms 532, 534 may be implemented on different metal layers of a printed circuit board. In such embodiments, the dipole arms 532, 534 of each dipole radiator 530 will be formed on parallel planes. The dipole radiators in such an embodiment will appear to be parallel in plan view.

The lengths of the dipole radiators 530 included in each antenna element 820 are different, with the dipole radiator 530A closest to the central feed point 510 having the shortest length and the lengths of the remaining dipole radiators 530 increasing with increasing distance from the central feed point 510. The distance d7 between the first dipole radiator 530A and the central feed point 510 may be about 0.1 k (e.g., between 0.06 k and 0.14 k in example embodiments). The distance d8 between the first dipole radiator 530A and the second dipole radiator 530B may be about 0.06 k (e.g., between 0.04 k and 0.08 k in example embodiments). The distance d9 between the second dipole radiator 530B and the third dipole radiator 530C may be about 0.18 k (e.g., between 0.15 k and 0.21 k in example embodiments). As discussed above, by adding a third dipole radiator 530C to each antenna element 820, the bandwidth of the antenna 800 may be increased further.

Figure 9:
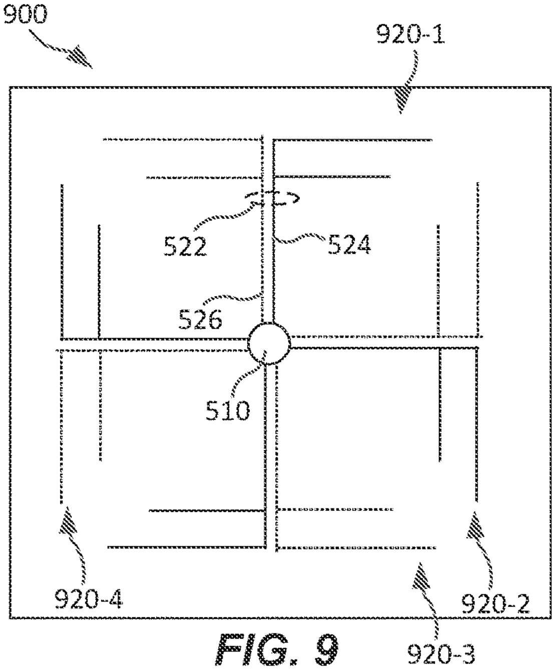
FIG. 9 is a schematic plan view of a horizontally polarized antenna according to additional embodiments of the present invention that includes four antenna elements.

FIG. 9 is a schematic plan view of a horizontally polarized antenna 900 according to additional embodiments of the present invention. As can be seen by comparing FIGS. 5 and 9, the antenna 900 differs from antenna 500 in that antenna 900 includes four antenna elements 920-1 through 920-4 that extend radially from the central feed point 510 whereas the antenna 500 only includes three antenna elements 520-1 through 520-3. Each antenna element 920 in antenna 900 may be angularly separated from adjacent antenna elements 920 by an angle of 90°.

The number of antenna elements included in an antenna having an Alford loop arrangement impacts the amount of ripple in the azimuth pattern of the antenna beam generated by the antenna, where the "ripple" refers to the variation in the peak gain as a function of direction. Generally speaking, the more antenna elements included in the antenna, the smaller the amount of ripple. In most applications, three antenna elements may provide sufficiently low levels of ripple. The antenna 900, however, may be used in applications where smaller amounts of ripple are required. The additional antenna element 920 included in antenna 900 may also increase the gain of antenna 900 as compared to antenna 500.

While the above-described antennas according to embodiments of the present invention are implemented in printed circuit boards, it will be appreciated that embodiments of the present invention are not limited thereto. For example, in other embodiments, the antennas may be implemented using sheet metal structures (e.g., dipole arms, feed lines, etc.) mounted on a dielectric support substrate.

Figure 10:
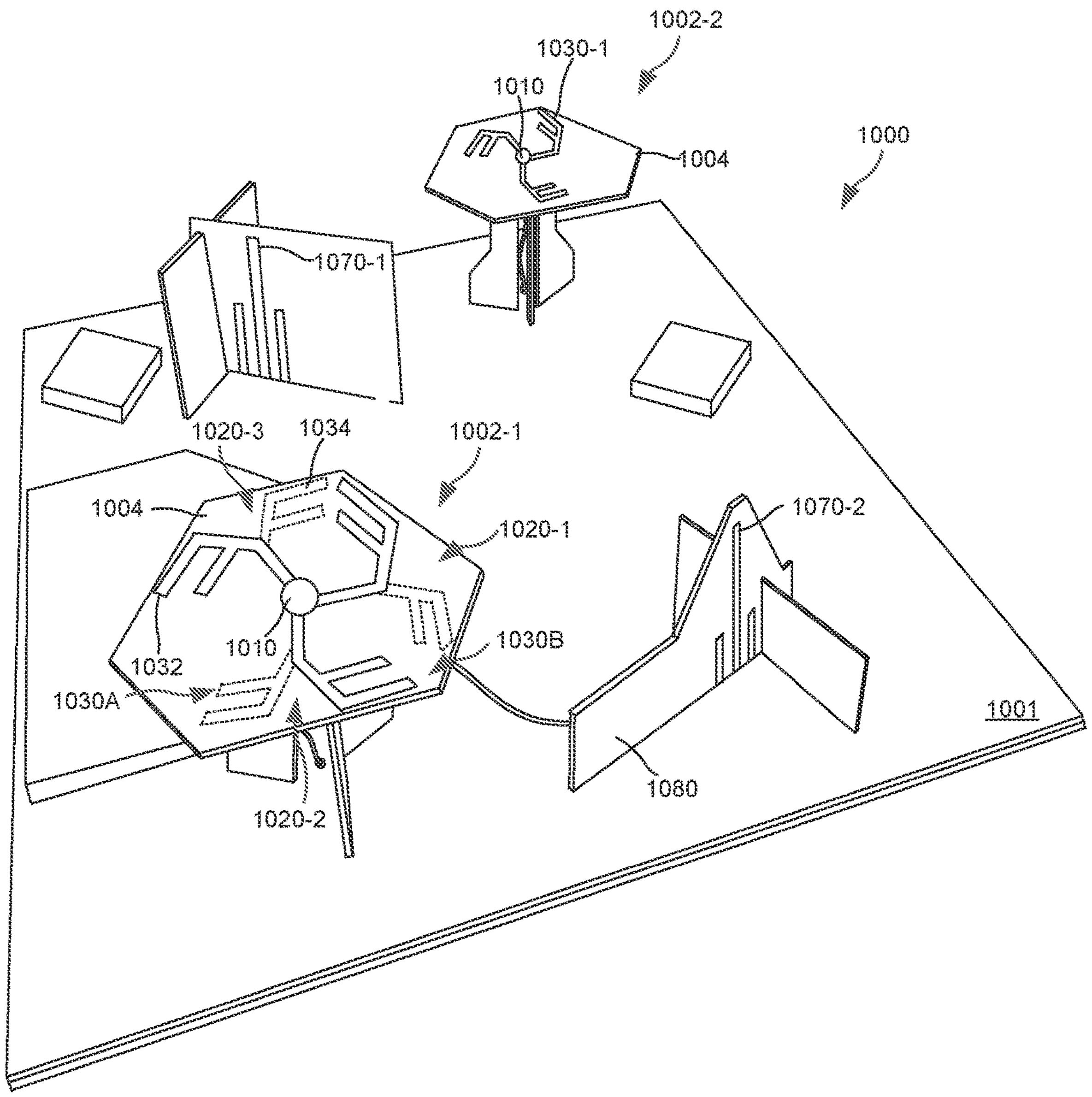
FIG. 10 is a schematic bottom view of various internal electronic components of a Wi-Fi access point according to embodiments of the present invention.

FIG. 10 is a schematic bottom view of various internal electronic components of a Wi-Fi access point 1000 according to embodiments of the present invention. An exterior housing of access point 1000 is omitted from FIG. 10 in order to show selected internal electronic components of the access point 1000. A plurality of baseband and RF electronic components of the access point 1000 (mostly not shown) including, for example, baseband circuitry, radios, a processor, a memory, duplexers, diplexers, RF amplifiers and the like may be mounted on a main printed circuit board 1001 (most of these elements are mounted on the top side of the main printed circuit board 1001 to reduce interference with the antennas).

First and second horizontally polarized antennas 1002-1, 1002-2 are mounted to extend downwardly from the main printed circuit board 1001 (note that in the view of FIG. 10 access point 1000 is upside down from the orientation in which it will be mounted for use). The antennas 1002-1, 1002-2 are configured to transmit and receive signals in both the 5 GHz frequency band and the 6 GHz frequency band. The first and second horizontally polarized antennas 1002-1, 1002-2 each comprise a radiator printed circuit board 1004 that is mounted on the main printed circuit board 1001 by three supports. Three antenna elements 1020-1 through 1020-3 are formed on each radiator printed circuit board 1004. As shown for antenna 1002-1, each antenna element 1020 may comprise first and second dipole radiators 1030A, 1030B, where each dipole radiator 1030 includes a first dipole arm 1032 formed on the bottom side of the radiator printed circuit board 1004 (shown in solid lines) and a second dipole arm 1034 formed on the top side of the radiator printed circuit board 1004 (shown in dashed lines). The antenna elements 1020 are connected to respective central feed points 1010 on the radiator printed circuit boards 1004. The second dipole arms 1034 are not shown for antenna 1002-2 to simplify the figure.

The antenna elements 1020 are mounted to extend in parallel to an RF ground plane that is formed in the main printed circuit board 1001, and are situated a predetermined distance downwardly from this RF ground plane. In some embodiments, the predetermined distance may be about ¼ of the operating wavelength of the antennas 1002-1, 1002-2. The three antenna elements 1020 of each antenna 1002-1, 1002-2 may be configured, for example, to generate a generally semi-spherical antenna beam that extends a full 360° in the azimuth (horizontal) plane. Thus, the antennas 1002-1, 1002-2 may provide generally omnidirectional coverage in the downward and sideward directions. The RF ground plane of printed circuit board 1001 will mostly reflect upwardly-directed radiation back downwardly, which is why the radiating pattern may have a generally semi-spherical shape as opposed to true omnidirectional (generally spherical) coverage.

The antennas 1002-1, 1002-2 are similar to antenna 500 of FIG. 5, with the only difference being that the dipole arms 1032, 1034 of each dipole radiator 1030 are spaced farther apart in antennas 1002-1, 1002-2 than in antenna 500. Thus, FIG. 10 illustrates another antenna according to embodiments of the present invention that includes multiple antenna elements in an Alford loop configuration where each antenna element includes multiple dipole radiators that are fed in-phase from a central feed point located at the bases of the respective antenna elements.

The access point 1000 further includes first and second vertically polarized antennas 1070-1, 1070-2 that may also be configured to transmit and receive signals in both the 5 GHz frequency band and the 6 GHz frequency band. Each vertically polarized antenna 1070 is implemented as a monopole antenna that is formed on a separate radiator printed circuit board 1080 that is mounted to extend downwardly from the main printed circuit board 1001. Each antenna 1002-1, 1002-2, 1070-1, 1070-2 may be part of a respective transmit/receive chain. Thus, the access point 1000 may transmit using 4×MIMO communications in both the 5 GHz frequency band and the 6 GHz frequency band.

It will be appreciated that the antennas included in access point 1000 may be replaced with any of the other antennas according to embodiments of the present invention discussed above. For example, each antenna 1002-1, 1002-2 could be replaced with the antenna 600 of FIG. 6 that includes directors, or with the antenna 700 that includes reflectors. In such embodiments, switches such as PIN diodes (not shown) may be used to selectively connect the directors 640 or reflectors 750 to ground in order to shape the antenna beams.

The access point may also include transmit/receive chains (including antennas) that operate in the 2.4 GHz band, but these components are not shown in FIG. 10 to simplify the drawing.

Figure 11:
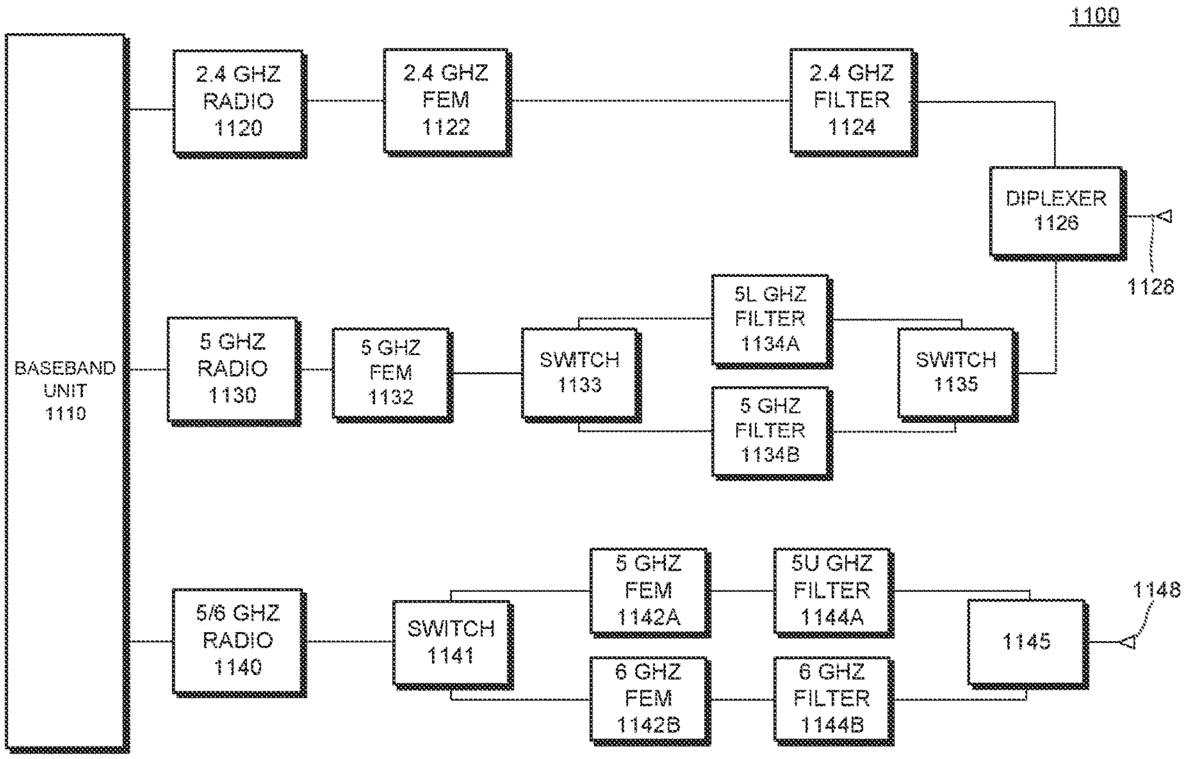
FIG. 11 is a block diagram of a tri-band access point in which antennas according to embodiments of the present invention may be used.

One application in which antennas according to embodiments of the present invention may be used is in tri-band access points having a 6 GHz radio that can be configured to operate in either the 6 GHz frequency band or a portion of the 5 GHz frequency band. FIG. 11 is a block diagram of such a tri-band access point 1100. The access point 1100 is a simplified version of one of the access points disclosed in the above-referenced '130 application. It will be appreciated that any of the antennas disclosed herein may be used to implement the antennas that are coupled to the 5/6 GHz transmit/receive chains of any of the access points disclosed in the '130 application.

As shown in FIG. 11, the access point 1100 includes a baseband processor or "WiFi chipset" 1110. The baseband processor 1110 is coupled to a 2.4 GHz radio 1120, a 5 GHz radio 1130 and a 5/6 GHz radio 1140.

The 2.4 GHz radio 1120 is coupled to a 2.4 GHz front end module 1122 that may include, for example, a high power amplifier that is used for transmit operations, a low noise amplifier that is used for receive operations and a pair of switches that are used to selectively connect one of the high power amplifier or the low noise amplifier to the output of the 2.4 GHz radio 1120. The 2.4 GHz front end module 1122 is connected to a bandpass filter 1124 that is configured to pass RF signals in the 2.401-2.484 GHz frequency range. The output of bandpass filter 1124 is connected to a diplexer 1126.

The 5 GHz radio 1130 is coupled to a 5 GHz front end module 1132 that may include, for example, a high power amplifier that is used for transmit operations, a low noise amplifier that is used for receive operations and a pair of switches that are used to selectively connect one of the high power amplifier or the low noise amplifier to the output of the 5 GHz radio 1130. The 5 GHz front end module 1132 is connected to a 1×2 RF switch 1133. The first output of switch 1133 is coupled to a 5 L GHz bandpass filter 1134A, and the second output of switch 1133 is coupled to a 5 GHz bandpass filter 1134B. The 5 L GHz bandpass filter 1134A is configured to pass RF signals in the 5.170-5.350 GHz frequency range, and the 5 GHz bandpass filter 1134B is configured to pass RF signals in the full 5 GHz frequency band. The outputs of bandpass filters 1134A, 1134B are connected to a second 2×1 switch 1135. The output of switch 1135 is connected to the diplexer 1126. The output of diplexer 1126 is coupled to an antenna 1128.

The 5 GHz radio 1130 may be configured to transmit and receive signals in either the full 5 GHz frequency band or in only the lower portion thereof. When the 5 GHz radio 1130 is configured to transmit and receive signals in only the lower portion of the 5 GHz frequency band, then switches 1132 and 1135 are set to couple the radio 1130 to the 5 L GHz filter 1134A. When the 5 GHz radio 1130 is configured to transmit and receive signals in the full 5 GHz frequency band, then switches 1132 and 1135 are set to couple the radio 1130 to the 5 GHz filter 1134B.

The 5/6 GHz radio 1140 can be configured (by hardware and/or software) to communicate in either the 5 GHz or 6 GHz frequency bands. The 5/6 GHz radio 1140 is coupled to a 1×2 RF switch 1141. The first output of switch 1141 is coupled to a 5 GHz front end module 1142A, and the second output of switch 1141 is coupled to a 6 GHz front end module 1142B. The 5 GHz front end module is connected to a 5 U GHz bandpass filter 1144A that is configured to pass RF signals in the 5.490-5.835 GHz frequency range. The output of the 5 U GHz bandpass filter 1144A is connected to a 2×1 switch 1145. The 6 GHz front end module 1142B is connected to a 6 GHz bandpass filter 1144B that is configured to pass RF signals in the 5.935-7.125 GHz frequency range. The output of the 6 GHz bandpass filter 1144B is connected to the 2×1 switch 1145. The output of switch 1145 is connected to an antenna 1148. The antenna 1148 may be implemented using any of the antennas according to embodiments of the present invention that are discussed above.

The 5/6 GHz radio 1140 may be configured to transmit and receive signals in either the 5 GHz or 6 GHz frequency band. When the 5/6 GHz radio 1140 is configured to transmit and receive signals in the 5 GHz frequency band, then switches 1141 and 1145 are set to couple the radio 1140 to the 5 GHz communication path. When the 5/6 GHz radio 1140 is configured to transmit and receive signals in the 6 GHz frequency band, then switches 1141 and 1145 are set to couple the radio 1140 to the 6 GHz communication path.

The access point 1100 of FIG. 11 may be configured to operate in two different modes. In the first mode, the access point 1100 may operate in all three of the 2.4 GHz, 5 GHz and 6 GHz frequency bands. The access point 1100 may be configured to operate in this first mode when, for example, 6 GHz client devices are present within the coverage area of the access point 1100. In the second mode, the access point 1100 may operate in only the 2.4 GHz and 5 GHz frequency bands. In particular, the 5 GHz radio 1130 may be configured to operate in the lower portion of the 5 GHz frequency band (i.e., it will be connected to the 5 L GHz filter 1134A), and the 5/6 GHz radio 1140 may be configured to operate in the upper portion of the 5 GHz frequency band (i.e., it will be connected to the 5 GHz front end module 1142A and the 5 U GHz filter 1144A). As such, both radios 1130 and 1140 may simultaneously support communications in different portions of the 5 GHz frequency band. Since the 5 GHz frequency band is sub-divided into two smaller sub-bands, the full power of the high power and low noise amplifiers in 5 GHz front end module 1132 may be spread across only the lower portion of the 5 GHz frequency band and the full power of the high power and low noise amplifiers in 5 GHz front end module 1142A may be spread across only the upper portion of the 5 GHz frequency band. The access point 1100 may operate in the second mode when, for example, no 6 GHz client devices are present within the coverage area of the access point 1100 or when the access point 1100 is installed in a jurisdiction in which WiFi operation in the 6 GHz frequency band is not authorized.

Figure 12:
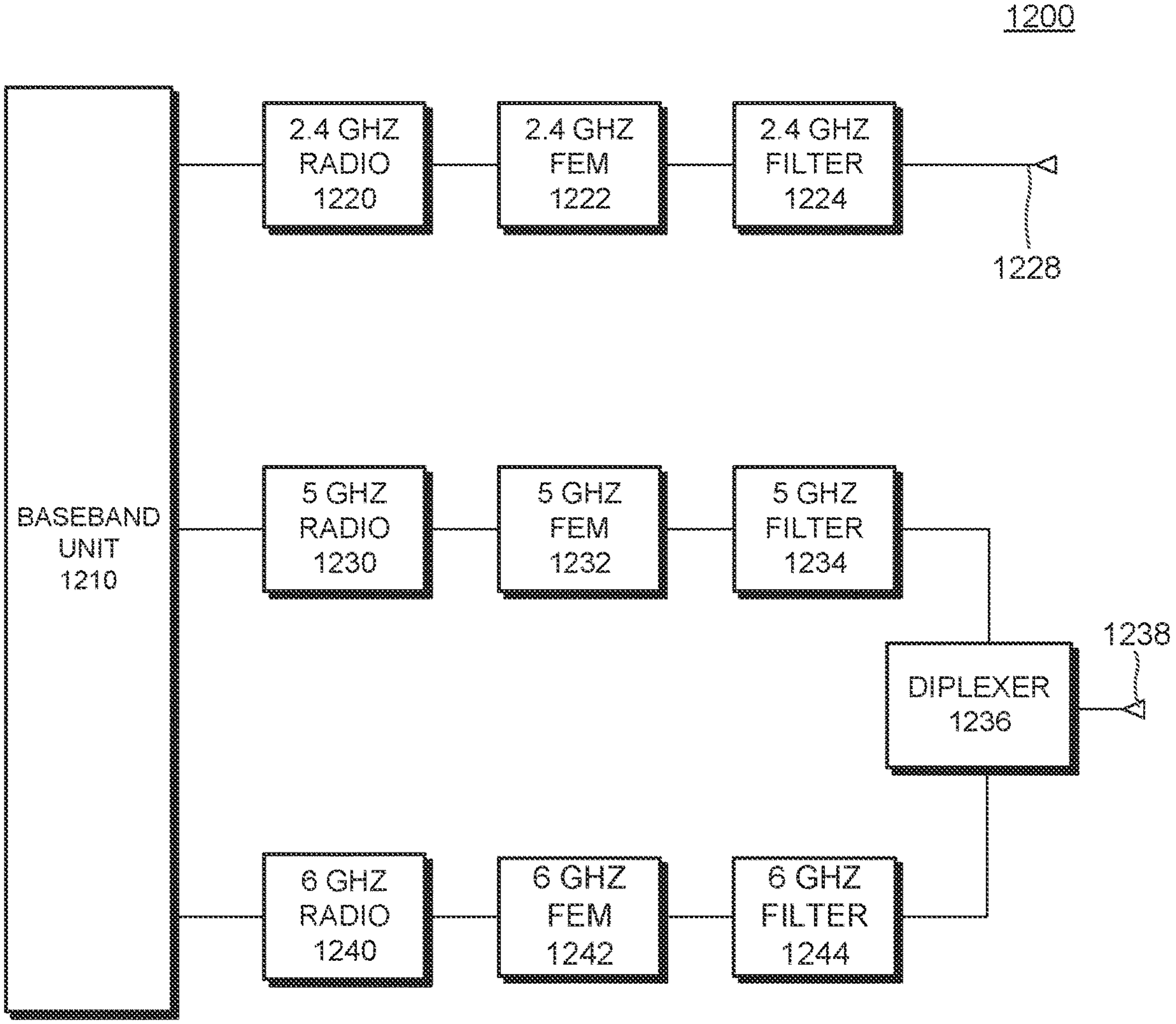
FIG. 12 is a block diagram of another tri-band access point in which antennas according to embodiments of the present invention may be used.

FIG. 12 is a block diagram of another tri-band access point 1200 in which antennas according to embodiments of the present invention may be used.

As shown in FIG. 12, the access point 1200 includes a baseband 1210 that is coupled to a 2.4 GHz radio 1220, a 5 GHz radio 1230 and a 5/6 GHz radio 1240. The 2.4 GHz radio 1220 is coupled to a 2.4 GHz front end module 1222 and a bandpass filter 1224 that is configured to pass RF signals in the 2.4 GHz frequency band. The output of bandpass filter 1224 is connected to an antenna 1228 that is configured to operate in the 2.4 GHz frequency band.

The 5 GHz radio 1230 is similarly coupled to a 5 GHz front end module 1232 and a bandpass filter 1234 that is configured to pass RF signals in the 5 GHz frequency band. The output of bandpass filter 1224 is connected to a diplexer 1236. The 6 GHz radio 1240 is similarly coupled to a 6 GHz front end module 1242 and a bandpass filter 1244 that is configured to pass RF signals in the 6 GHz frequency band.

The output of bandpass filter 1244 is also connected to the diplexer 1236. The diplexer 1236 is connected to an antenna 1238 that is configured to operate in both the 5 GHz and 6 GHz frequency bands. The antenna 1238 may be any of the antennas according to embodiments of the present invention.

Figure 13:
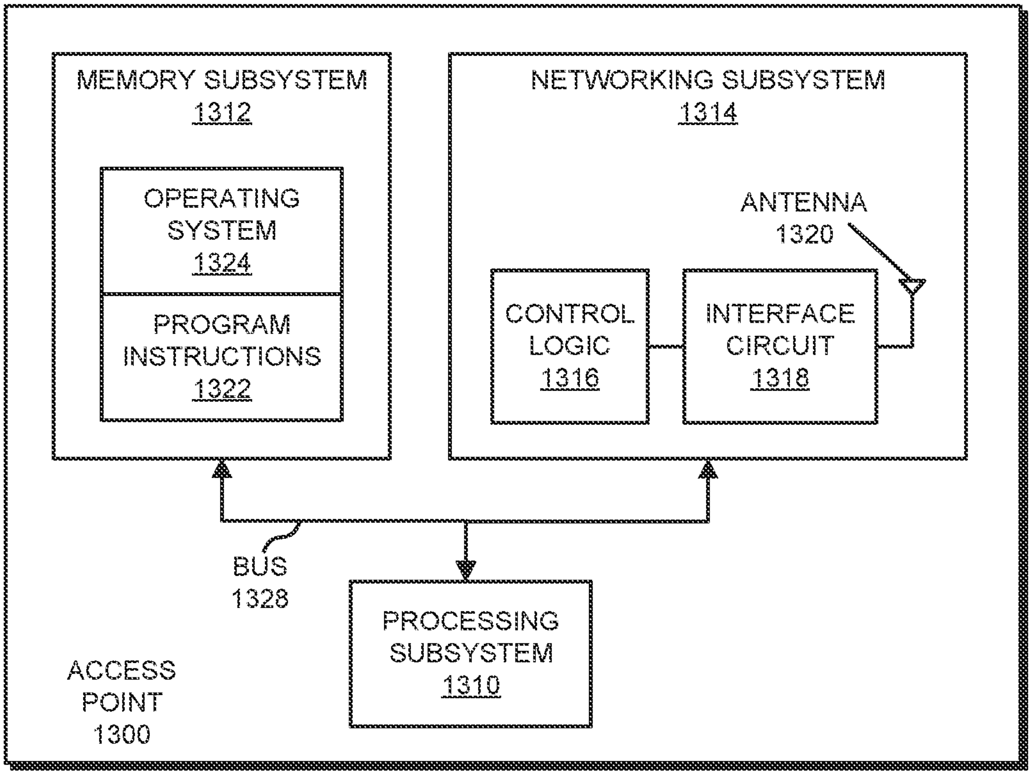
FIG. 13 is a block diagram of an access point according to embodiments of the present invention.

FIG. 13 is a block diagram illustrating an access point 1300 in accordance with some embodiments. The access point 1300 includes a processing subsystem 1310, a memory subsystem 1312, and a networking subsystem 1314. Processing subsystem 1310 includes one or more devices configured to perform computational operations. Memory subsystem 1312 includes one or more devices for storing data and/or instructions. In some embodiments, the instructions may include an operating system and one or more program modules which may be executed by processing subsystem 1310.

Networking subsystem 1314 includes one or more devices configured to couple to and communicate on a wired and/or wireless network (i.e., to perform network operations), including: control logic 1316, an interface circuit 1318 and one or more radiating elements 1320. Thus, electronic device 1300 may or may not include the one or more radiating elements 1320. Networking subsystem 1314 includes at least a networking system based on the standards described in IEEE 802.11 (e.g., a Wi-Fi networking system).

Networking subsystem 1314 includes processors, controllers, radios/radiating elements, sockets/plugs, and/or other devices used for coupling to, communicating on, and handling data and events for each supported networking system. Note that mechanisms used for coupling to, communicating on, and handling data and events on the network for each network system are sometimes collectively referred to as a "network interface" for the network system. Access point 1300 may use the mechanisms in networking subsystem 1314 for performing simple wireless communication, e.g., transmitting frames and/or scanning for frames transmitted by other electronic devices.

Processing subsystem 1310, memory subsystem 1312, and networking subsystem 1314 are coupled together using bus 1328. Bus 1328 may include an electrical, optical, and/or electro-optical connection that the subsystems can use to communicate commands and data among one another.

The operations performed in the communication techniques according to embodiments of the present invention may be implemented in hardware or software, and in a wide variety of configurations and architectures. For example, at least some of the operations in the communication techniques may be implemented using program instructions 1322, operating system 1324 (such as a driver for interface circuit 1318) or in firmware in interface circuit 1318. Alternatively or additionally, at least some of the operations in the communication techniques may be implemented in a physical layer, such as hardware in interface circuit 1318.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. An access point, comprising an access point printed circuit board that has radio circuitry mounted thereon; and an antenna, comprising:

an antenna printed circuit board that includes a central feed point and a plurality of antenna elements formed therein, the antenna elements extending radially from the central feed point, where each antenna element comprises:

a feed line that is coupled to the central feed point, the feed line including a feed conductor and a ground conductor;

at least two dipole radiators coupled to the feed line, each dipole radiator comprising a first dipole arm that is coupled to the feed conductor and a second dipole arm that is coupled to the ground conductor, wherein a first length of a first of the dipole radiators is different than a second length of a second of the dipole radiators, and wherein each of the dipole radiators is fed in-phase, wherein the antenna printed circuit board is mounted on the access point printed circuit board and extends parallel to the access point printed circuit board.

2. The access point of claim 1, wherein the antenna printed circuit board comprises a two-metal-layer printed circuit board having a first metal layer and a second metal layer.

3. The access point of claim 2, wherein the feed conductor and the first dipole arm of each dipole radiator of each of the antenna elements are formed in the first metal layer and the ground conductor and the second dipole arm of each dipole radiator of each of the antenna elements are formed in the second metal layer.

4. The access point of claim 1, wherein a first of the antenna elements includes at least three dipole radiators, where each dipole radiator has a different length.

5. The access point of claim 4, wherein a second of the antenna elements includes at least three dipole radiators, and wherein a length of each of the dipole radiators of a first of the antenna elements is equal to a length of a respective one of the dipole radiators of the second of the antenna elements.

6. The access point of claim 1, wherein the antenna includes a total of three antenna elements, and wherein each antenna element extends from the central feed point in a direction that is offset by 120° from the direction that the other two antenna elements extend from the central feed point.

7. The access point of claim 1, wherein the first of the dipole radiators of a first of the antenna elements is farther from the central feed point than is the second of the dipole radiators of the first of the antenna elements.

8. An antenna, comprising:

a printed circuit board that includes a central feed point and a plurality of antenna elements formed therein, the antenna elements extending radially from the central feed point, where each antenna element comprises:

a feed line that is coupled to the central feed point, the feed line including a feed conductor and a ground conductor;

at least two dipole radiators coupled to the feed line, each dipole radiator comprising a first dipole arm that is coupled to the feed conductor and a second dipole arm that is coupled to the ground conductor, wherein a first length of a first of the dipole radiators is different than a second length of a second of the dipole radiators, and wherein each of the dipole radiators is fed in-phase, wherein the at least two dipole radiators comprise an outermost dipole radiator and an innermost dipole radiator, the outermost dipole radiator positioned farther from the central feed point than the innermost dipole radiator and the outermost dipole radiator being longer than the innermost dipole radiator, wherein the antenna further comprises either a plurality of directors or a plurality of reflectors, where each director or reflector is part of a respective one of the antenna elements, the directors or reflectors radially arranged about the central feed point and positioned outwardly of the respective outermost dipole radiators, wherein each director, if provided, is shorter than a respective one of the outermost dipole radiators and each reflector, if provided, is longer than a respective one of the outermost dipole radiators, wherein each director or reflector is coupled to a ground reference through a respective switch.

9. An antenna, comprising:

a plurality of antenna elements extending radially from a central region, where each antenna element comprises:

a feed line that is coupled to a power divider, the feed line including a feed conductor and a ground conductor; and at least two dipole radiators coupled to the feed line, each dipole radiator comprising a first dipole arm that extends in a first direction from the feed line and a second dipole arm that extends in a second direction from the feed line that is different than the first direction, wherein the feed conductor is coupled to each first dipole arm, and the ground conductor is coupled to each second dipole arm, and wherein a first length of a first of the dipole radiators is different than a second length of a second of the dipole radiators, wherein the at least two dipole radiators comprise an outermost dipole radiator and an innermost dipole radiator, the outermost dipole radiator positioned farther from the central region than the innermost dipole radiator and the outermost dipole radiator being longer than the innermost dipole radiator, and the antenna further comprising a plurality of directors, where each director is part of a respective one of the antenna elements, the directors radially arranged about the central region and positioned outwardly of the respective outermost dipole radiators, wherein each director is shorter than the outermost dipole radiator of the antenna element that the director is part of, wherein each director is coupled to a ground reference through a respective switch.

10. The antenna of claim 9, wherein the second direction is opposite the first direction.

11. The antenna of claim 9, wherein a first of the antenna elements includes at least three dipole radiators, where each dipole radiator has a different length, wherein a second of the antenna elements includes at least three dipole radiators, and wherein a length of each of the dipole radiators of the first of the antenna elements is equal to a length of a respective one of the dipole radiators of the second of the antenna elements.

12. The antenna of claim 9, wherein the antenna includes a total of three antenna elements, and wherein each antenna element extends from the central region in a direction that is offset by 120° from the direction that the other two antenna elements extend from the central region.

13. The antenna of claim 9, wherein the first of the dipole radiators of a first of the antenna elements is farther from the central region than is the second of the dipole radiators of the first of the antenna elements.

14. An antenna, comprising:

a plurality of antenna elements extending radially from a central region, where each antenna element comprises:

a feed line that is coupled to a power divider, the feed line including a feed conductor and a ground conductor; and at least two dipole radiators coupled to the feed line, each dipole radiator comprising a first dipole arm that extends in a first direction from the feed line and a second dipole arm that extends in a second direction from the feed line that is different than the first direction, wherein the feed conductor is coupled to each first dipole arm, and the ground conductor is coupled to each second dipole arm, and wherein a first length of a first of the dipole radiators is different than a second length of a second of the dipole radiators, wherein the at least two dipole radiators comprise an outermost dipole radiator and an innermost dipole radiator, the outermost dipole radiator positioned farther from the central region than the innermost dipole radiator and the outermost dipole radiator being longer than the innermost dipole radiator, and the antenna further comprising a plurality of reflectors, where each reflector is part of a respective one of the antenna elements, the reflectors radially arranged about the central region and positioned outwardly of the respective outermost dipole radiators, wherein each reflector is longer than the outermost dipole radiator of the antenna element that the reflector is part of, wherein each reflector is coupled to a ground reference through a respective switch.

15. The antenna of claim 8, wherein the antenna includes the plurality of directors.

16. The antenna of claim 8, wherein the antenna includes the plurality of reflectors.

17. The antenna of claim 14, wherein the second direction is opposite the first direction.

18. The antenna of claim 14, wherein a first of the antenna elements includes at least three dipole radiators, where each dipole radiator has a different length, wherein a second of the antenna elements includes at least three dipole radiators, and wherein a length of each of the dipole radiators of the first of the antenna elements is equal to a length of a respective one of the dipole radiators of the second of the antenna elements.

19. The antenna of claim 14, wherein the antenna includes a total of three antenna elements, and wherein each antenna element extends from the central region in a direction that is offset by 120° from the direction that the other two antenna elements extend from the central region.

* * * * *